(12) United States Patent
Kowalczyk et al.

(10) Patent No.: US 8,877,133 B2
(45) Date of Patent: Nov. 4, 2014

(54) APPARATUSES FOR STRIPPING GASEOUS HYDROCARBONS FROM PARTICULATE MATERIAL AND PROCESSES FOR THE SAME

(75) Inventors: Mitchell John Kowalczyk, Brookfield, IL (US); Thomas William Lorsbach, Austin, TX (US); Chad R. Huovie, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 509 days.

(21) Appl. No.: 13/339,004

(22) Filed: Dec. 28, 2011

(65) Prior Publication Data

US 2013/0172171 A1    Jul. 4, 2013

(51) Int. Cl.
*B01J 19/32*    (2006.01)
*B01J 8/18*    (2006.01)

(52) U.S. Cl.
CPC . *B01J 19/32* (2013.01); *B01J 8/189* (2013.01)
USPC .......................................... 422/144; 422/255

(58) Field of Classification Search
CPC ............ B01J 2219/32241; B01J 2219/32258; B01J 2219/32262; B01J 19/32268; B01J 2219/32272; B01J 2219/32275; B01J 8/189; B01J 8/1863
USPC .................................................. 422/144, 255
See application file for complete search history.

(56) References Cited

U.S. PATENT DOCUMENTS

| | | | |
|---|---|---|---|
| 3,728,239 A | 4/1973 | McDonald | |
| 4,497,751 A | 2/1985 | Pluss | |
| 4,497,753 A | 2/1985 | Streiff | |
| 4,950,430 A | 8/1990 | Chen et al. | |
| 5,656,243 A | 8/1997 | Luckenbach et al. | |
| 6,224,833 B1 | 5/2001 | Rall | |
| 6,409,378 B1 | 6/2002 | Kessler | |
| 7,179,427 B2 | 2/2007 | Marchant et al. | |
| 7,332,132 B2 | 2/2008 | Hedrick et al. | |
| 7,799,285 B2 | 9/2010 | Huziwara et al. | |
| 2005/0040075 A1 | 2/2005 | Cerqueira et al. | |
| 2005/0205467 A1 | 9/2005 | Hedrick et al. | |
| 2010/0174125 A1 | 7/2010 | Tyler et al. | |

FOREIGN PATENT DOCUMENTS

WO    2008034769 A1    3/2008

OTHER PUBLICATIONS

Zhang, Z., et al. "Commercial application of novel FDFCC grid packing type stripper," China Petroleum Processing and Petrochemical Technology, No. 4, p. 43-47; Dec. 2007.
"Columns and internals review: Koch-Glitsch, LP," Hydrocarbon Engineering, vol. 10, No. 11, p. 93; Nov. 2005.
Letzsch, W.S., "Special report: Revitalize stripping operations with structured packing," Hydrocarbon Processing, vol. 82, No. 9, p. 69-72; Sep. 2003.
Cerqueira, H.S., Use of KFBE structured packing for FCC stripper improvement in heavy residue application, ACS Division of Petroleum Chemistry, Inc. Preprints, vol. 48, No. 3, p. 170-171: Sep. 2003.

*Primary Examiner* — Lessanework Seifu
(74) *Attorney, Agent, or Firm* — James C Paschall

(57) ABSTRACT

Apparatuses and processes are provided for stripping gaseous hydrocarbons from particulate material. One process comprises the step of contacting particles containing hydrocarbons with a stripping vapor in countercurrent flow to remove at least a portion of the hydrocarbons with the stripping vapor to form stripped particles. Contacting the particles includes advancing the particles down a sloping element of a structured packing toward a lower section of the sloping element. The particles are passed through a drainage gap formed between a pair of reinforcing rod sections that are disposed adjacent to the lower section of the sloping element. The particles are contacted with the stripping vapor that is rising up adjacent to the drainage gap.

20 Claims, 3 Drawing Sheets

APPARATUSES FOR STRIPPING GASEOUS HYDROCARBONS FROM PARTICULATE MATERIAL AND PROCESSES FOR THE SAME

TECHNICAL FIELD

The present invention relates generally to apparatuses and processes for stripping, and more particularly relates to apparatuses and processes for stripping gaseous hydrocarbons from particulate material, such as catalyst particles and the like.

BACKGROUND

A variety of processes contact finely divided particulate material with a hydrocarbon feedstock under conditions to fluidize the particulate material to affect transport of the particulate material to different stages of the process. Such processes commonly employ a subsequent stripping operation to remove at least some of the gaseous hydrocarbons that have become adsorbed and/or entrained within the particulate material. One example is fluid catalytic cracking (FCC) of hydrocarbons. FCC of hydrocarbons is a primary refinery process for the production of gasoline and light hydrocarbon products from heavy hydrocarbon charge stocks such as vacuum gas oils or residual feedstock.

The basic equipment utilized in the fluid catalytic cracking of hydrocarbons includes a reactor, a regenerator, and a catalyst stripper. The reactor includes a reaction or contact zone and a separation zone. In the contact zone, a hydrocarbon feed material, e.g., oil, is contacted with a catalyst made up of a finely divided or particulate solid material. The catalyst for the reaction is transported like a fluid by passing gas or vapor through the catalyst at sufficient velocity to produce a desired regime of fluid transport. Contact of the oil with the fluidized particulate material promotes the cracking reactions. As the cracking reactions proceeds, substantial amounts of carbonaceous material, called coke, is deposited on and deactivates the catalyst (commonly referred to herein as "spent catalyst"). In the separation zone, product vapors from the cracking reaction are separated from the catalyst. Further product separation takes place in the catalyst stripper that receives catalyst from the separation zone and removes trapped gaseous hydrocarbons from the catalyst by countercurrent contact with an inert stripping medium. The catalyst is circulated to the regenerator section that includes a regeneration zone where high temperature regeneration of the catalyst occurs by burning coke from the catalyst in the presence of oxygen. Spent catalyst is continually removed from the reaction zone and replaced by essentially coke-free catalyst from the regeneration zone.

A common method of stripping catalyst in the FCC of hydrocarbons or other similar processes includes passing an inert stripping gas, such as or typically steam, countercurrent through a flowing stream of catalyst. Such steam stripping operations, with varying degrees of efficiency, remove the hydrocarbon vapors that are adsorbed on and/or entrained with the catalyst. The efficiency of catalyst stripping is typically increased by employing structured packing that includes vertically spaced baffles to cascade the catalyst from side to side as it moves down the catalyst stripper and countercurrently contacts a stripping medium. Moving the catalyst from side to side increases both the residence time and contact between the catalyst and the stripping medium so that more hydrocarbons are stripped from the catalyst. In such structured packing, the catalyst and stripping medium travel a labyrinthine path through a series of baffles located to affect two-phase mixing. Catalyst and gas contact is increased by this arrangement that leaves no open vertical path for single phase flow through the stripping apparatus. The structured packing includes rows of baffles that are typically secured in position with reinforcing rods some of which are secured to the lower sections of the baffles.

Accordingly, it is desirable to provide apparatuses and processes for stripping gaseous hydrocarbons from particulate material that provide high stripping efficiency. Furthermore, other desirable features and characteristics of the present invention will become apparent from the subsequent detailed description and the appended claims, taken in conjunction with the accompanying drawings and this background.

BRIEF SUMMARY

Apparatuses and processes for stripping gaseous hydrocarbons from particulate material are provided herein. In accordance with an exemplary embodiment, an apparatus for stripping gaseous hydrocarbons from particulate material comprises a structured packing configured for passage of a stripping vapor and particles that contain hydrocarbons in countercurrent contacting flow to remove at least a portion of the hydrocarbons with the stripping vapor to form stripped particles. The structured packing comprises a first formed strip comprising a sloping element that has a lower section. A pair of reinforcing rod sections are disposed adjacent to the lower section of the sloping element and are spaced apart such that a drainage gap is formed between the pair of reinforcing rod sections for passage of the particles.

In accordance with another exemplary embodiment, an apparatus for stripping gaseous hydrocarbons from particulate material is provided. The apparatus comprises a vessel that contains a stripping section. An entrance is for advancing particles that contain hydrocarbons to the stripping section. A distributor is for uniformly communicating a stripping vapor to the stripping section. A structured packing is disposed in the stripping section and is configured for passage of the particles and the stripping vapor in countercurrent contacting flow to remove at least a portion of the hydrocarbons with the stripping vapor to form stripped particles. The structured packing comprises a first formed strip that comprises first alternating segments. The first alternating segments define a first vertical element that has a first upper portion and a first lower portion. The first alternating segments each have a first upper sloping element and a first lower sloping element extending from the first upper portion and the first lower portion, respectively, in opposite directions and at an incline to the first vertical element. The first upper sloping elements and independently the first lower sloping elements of the first alternating segments extend in alternating directions that are angular to each other. A plurality of reinforcing rod sections comprising a first plurality of reinforcing rod sections and/or a second plurality of reinforcing rod sections. The first plurality of upper reinforcing rod sections overlie the first upper portion of the first vertical element and are disposed adjacent to the first upper sloping elements. The first plurality of upper reinforcing rod sections are spaced apart such that a first plurality of drainage gaps are formed each correspondingly adjacent to one of the first upper sloping elements. The second plurality of lower reinforcing rod sections are disposed adjacent to the first lower sloping elements of alternate segments of the first alternating segments distally from the first vertical element. The second plurality of lower reinforcing rod sections are spaced apart such that a second plurality of drainage gaps are formed each correspondingly adjacent to one of the first lower sloping elements of the alternate segments. A port is for receiving the stripped particles.

In accordance with another exemplary embodiment, a process for stripping gaseous hydrocarbons from particulate material is provided. The process comprises the step of contacting particles containing hydrocarbons with a stripping vapor in countercurrent flow to remove at least a portion of the hydrocarbons with the stripping vapor to form stripped particles. Contacting the particles includes advancing the particles down a sloping element of a structured packing toward a lower section of the sloping element. The particles are passed through a drainage gap formed between a pair of reinforcing rod sections that are disposed adjacent to the lower section of the sloping element. The particles are contacted with the stripping vapor that is rising up adjacent to the drainage gap

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to apparatuses and processes for stripping gaseous hydrocarbons from particulate material. Unlike the prior art, the exemplary embodiments taught herein provide a structured packing that is disposed in a stripping section of a vessel. The structured packing is configured for passage of particles that contain hydrocarbons and a stripping vapor in countercurrent contacting flow to remove at least a portion of the hydrocarbons with the stripping vapor to form stripped particles. The structured packing comprises a plurality of sloping elements that are configured to move the particles side to side as they advance through the structured packing to improve contact between the particles and the stripping vapor. The sloping elements are coupled to a plurality of reinforcing rod sections that are disposed adjacent to lower sections of the sloping elements. The reinforcing rod sections are spaced apart such that drainage gaps are formed between the reinforcing rod sections. In an exemplary embodiment, each of the sloping elements is associated with one of the drainage gaps that is formed adjacent to the lower section of the sloping element. As the particles descend through the structured packing, the particles contact and advance down the sloping elements towards the lower sections of the sloping elements. The drainage gaps allow the particles to advance over the lower sections past the reinforcing rod sections. Stripping vapor that is rising up adjacent to the drainage gaps contacts the particles in countercurrent flow to remove at least a portion of the gaseous hydrocarbons.

Figure 1:
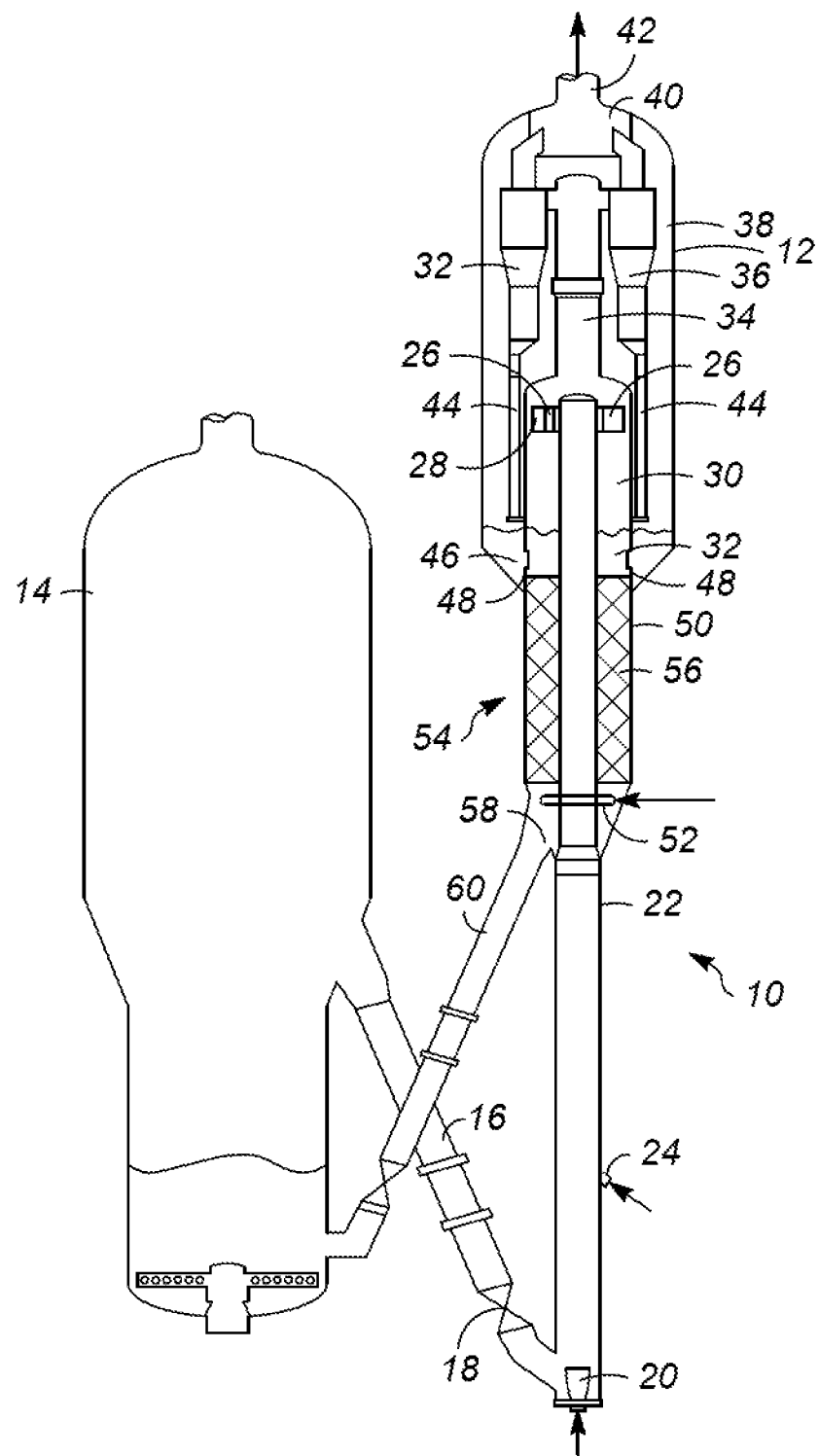
FIG. 1 is a sectional side view of a FCC unit including a stripper section in accordance with an exemplary embodiment.

Referring to FIG. 1, a sectional side view of a FCC unit 10 to which an apparatus and process for stripping gaseous hydrocarbons from particulate material in accordance with exemplary embodiments contemplated herein may be applied. The FCC unit 10 is configured for fluid catalytic cracking of hydrocarbons. The FCC unit 10 comprises a reactor 12 and a riser 22 that receive a FCC feedstock, e.g., oil. A regenerator 14 is in fluid communication with the reactor 12 to receive spent catalyst. The feedstock is cracked to form a product effluent containing hydrocarbons ranging from methane through relatively high boiling point materials along with hydrogen and hydrogen sulfide. In an exemplary embodiment, the feedstock is cracked at cracking conditions that include a temperature of from about 450 to about 600° C., and a pressure of from about 65 to about 500 kPa(g). During the cracking reaction, a carbonaceous by-product is deposited on the circulating catalyst. The carbonaceous by-product, termed "coke," is continuously burned off the spent catalyst in the regenerator 14. In an exemplary embodiment, the regenerator 14 operates at regeneration conditions that include a temperature of from about 600 to about 800° C., and a pressure of from about 35 to about 500 kPa(g).

As illustrated, a regenerated catalyst standpipe 16 transfers catalyst from the regenerator 14 at a rate regulated by a slide valve 18. A fluidization medium from a nozzle 20 transports the catalyst upwardly through a lower portion of a riser 22 (e.g. "reaction zone") at a relatively high density until a feed injection nozzle(s) 24 injects the feedstock across a flowing stream of the catalyst particles. In an exemplary embodiment, the FCC unit 10 is configured to operate with a catalyst to oil (C/O) ratio, based on the weight of catalyst and feedstock entering the bottom of the riser 22, of from about 4:1 to about 20:1.

The resulting mixture continues upward through an upper portion of the riser 22 until at least two disengaging arms 26 tangentially discharge the mixture of gas and catalyst through openings 28 from a top of the riser 22 into a disengaging vessel 30 that affects separation of the gases from the catalyst. Most of the catalyst discharged from the openings 28 fall downwardly in the disengaging vessel 30 into a bed 32. A transport conduit 34 carries the separated hydrocarbon vapors with entrained catalyst to one or more cyclones 36 in a separator vessel 38. The cyclones 36 separate the spent catalyst from the hydrocarbon vapor stream. A collection chamber 40 gathers the separated hydrocarbon vapor streams from the cyclones 36 for passage as the product effluent to an outlet nozzle 42 and into a downstream fractionation zone (not shown). Reactor cyclone diplegs 44 discharge catalyst from the cyclones 36 into a bed 46. Catalyst from bed 46 passes through ports 48 into the bed 32 in the disengaging vessel 30. Catalyst and adsorbed and/or entrained hydrocarbons pass from the disengaging vessel 30 into a stripping section 50. Catalyst from the openings 28 separated in the disengaging vessel 30 passes directly into the stripping section 50. Thus, entrances for advancing the catalyst into the stripping section 50 include the openings 28 and the ports 48.

Stripping gas, such as steam, enters a lower portion of the stripping section 50 through a distributor 52 and rises countercurrent to a downward flow of the catalyst through the stripping section 50. As the catalyst and the stripping gas are in countercurrent contact, adsorbed and/or entrained hydrocarbons are displaced or stripped from the catalyst and flow upwardly with the stripping gas for recovery by the cyclones 36. The distributor 52 distributes the stripping gas around the circumference of the stripping section 50. To facilitate hydrocarbon stripping from the catalyst, a structured packing 54 comprising a plurality of formed strips 56 (e.g. ribbons or strips made from formed metal sheet, metal plate, and/or the like) are arranged in the stripping section 50.

The spent catalyst is removed from the stripping section 50 and is passed through a port 58. A spent catalyst standpipe 60 carries the spent catalyst to the regenerator 14. The catalyst is regenerated in the regenerator 14 as is well known in the art and is sent back to the riser 22 through the regenerated catalyst standpipe 16.

Figure 2:
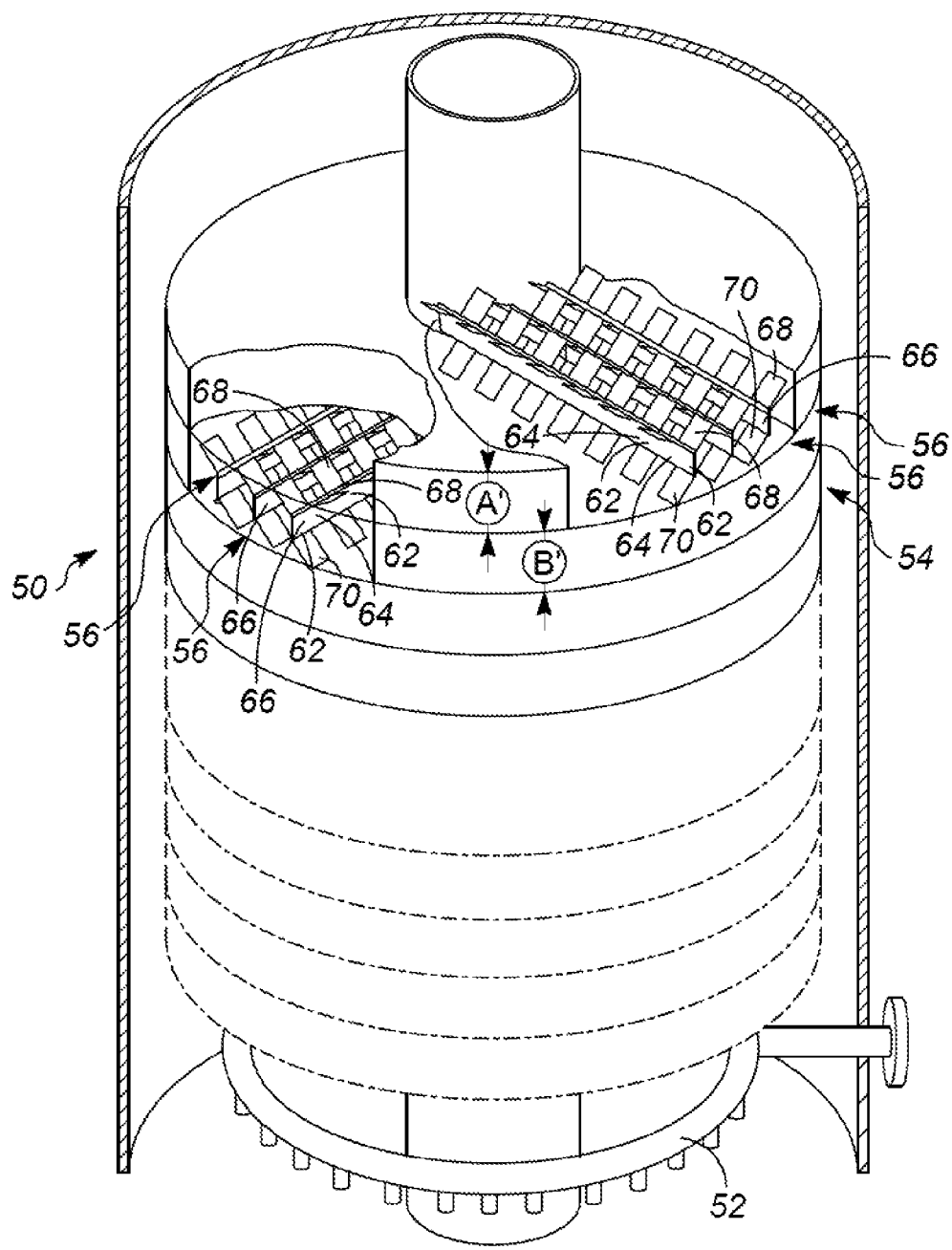
FIG. 2 is an enlarged partial perspective view of structured packing in the stripper section of FIG. 1.

Referring to FIG. 2, a partial perspective view of the stripper section 50 in accordance with an exemplary embodiment is provided. Disposed in the stripper section 50 is the structured packing 54 that includes the formed strips 56. As illustrated, each of the formed strips 56 comprises alternating segments 62 and 64 that together define a vertical element 66 for the given formed strip 56. Each of the alternating segments 62 and 64 have an upper sloping element 68 (e.g. upper baffle or upper baffle plate) and a lower sloping element 70 (e.g. lower baffle or lower baffle plate) that extend in opposite directions and at an incline to a corresponding vertical element 66. The upper sloping elements 68 and independently the lower sloping elements 70 of the alternating segments 62 and 64 extend in alternating directions that are angular to each other. Adjacent formed strips 56 are arranged together in an array to define a plurality of layers including layers A' and B'. As illustrated, the upper and lower sloping elements 68 and 70 of a given segment of the alternating segments 62 and 64 are substantially parallel to each other, and the vertical elements 66 in the same layer A' and B' are arranged substantially parallel. The layers A' and B' are stacked on top of each other in the stripping section 50 and may be oriented differently, such as perpendicular to each other as illustrated or otherwise. As configured, the vertical elements 66, and the upper and lower sloping elements 68 and 70 obstruct the passage of stripping gas and catalyst and openings are formed between the alternating positions of the upper and lower sloping elements 68 and 70, allowing for side to side and limited vertical passage of stripping vapor and catalyst through the structured packing 54 to define a network of torturous pathways.

Figure 3:
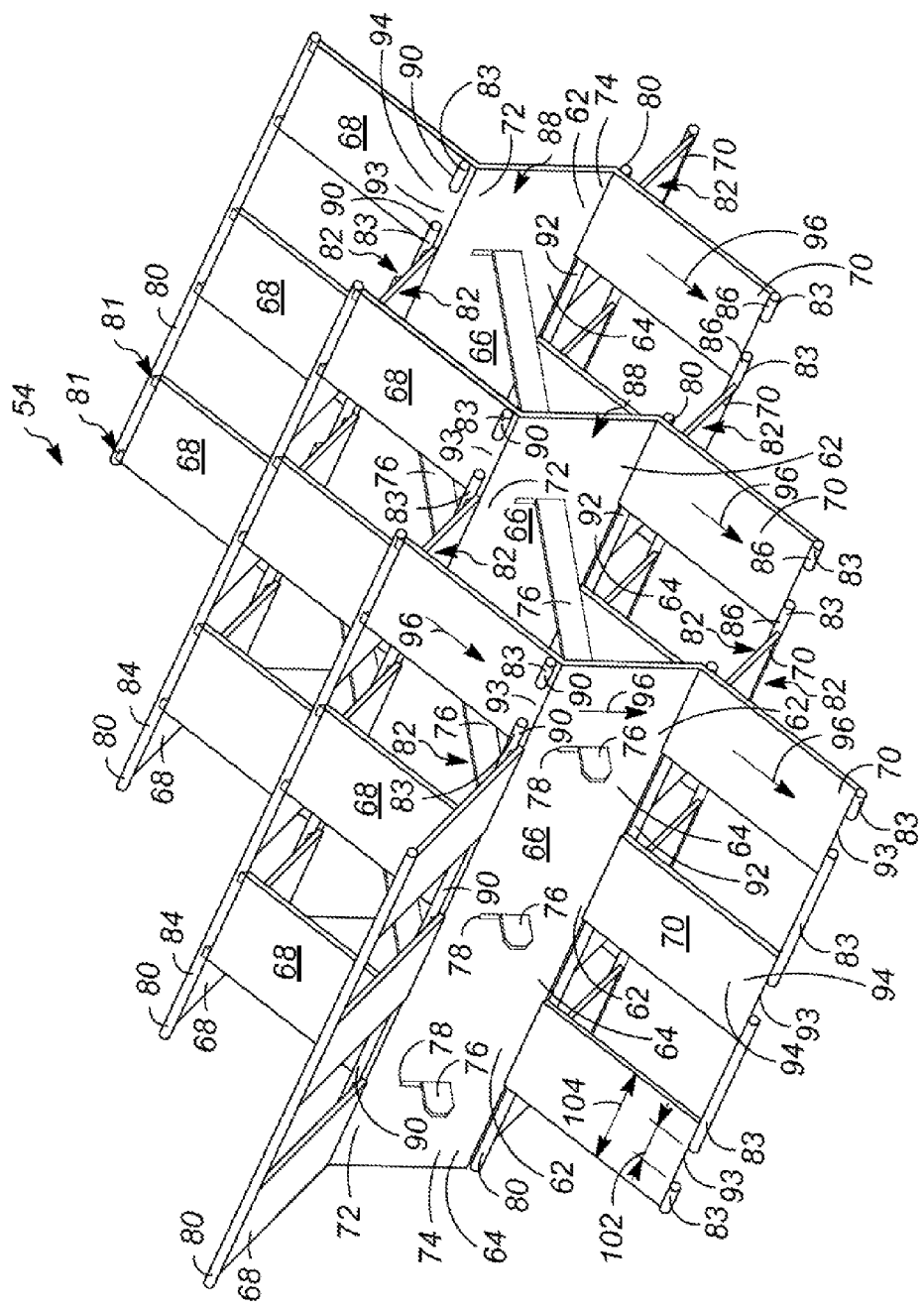
FIG. 3 is a partial perspective view of multiple segments of structured packing illustrated in FIG. 2.

Referring to FIG. 3, a partial perspective view of the structured packing 54 including multiple alternating segments 62 and 64 of three formed strips 56 in accordance with an exemplary embodiment is provided. The upper sloping elements 68 of adjacent segments of the alternating segments 62 and 64 extend from an upper portion 72 of a given vertical element 66, and can have different configurations that are angular to each other. The lower sloping elements 70 of adjacent segments of the alternating segments 62 and 64 extend from a lower portion 74 of a given vertical element 66 and can have different configurations that are angular to each other. Tie rods 76 extend through apertures 78 formed in the vertical elements 66 to secure the formed strips 56 in an array.

A plurality of reinforcing rods 80 and a plurality of reinforcing rod sections 83 are seated in and secured (e.g. via welds 81 or the like) to troughs 82 that are defined by the upper and lower sloping elements 68 and 70 of adjacent segments of the alternating segments 62 and 64. The reinforcing rods 80 and/or the reinforcing rod sections 83 can have a circular cross-section as shown with the same or different diameters, or can have any other cross-section suitable for providing structure. The reinforcing rods 80 and the reinforcing rod sections 83 help to stabilize the positions of the formed strips 56 (e.g. when the formed strips 56 are stacked in layers A' and B') including stabilizing the inclined positions of the upper and lower sloping elements 68 and 70.

In particular and as illustrated, an upper block reinforcing rod 84 and lower block reinforcing rod sections 86 are disposed along and secured to the upper and lower sloping elements 68 and 70, respectively, of alternate segments of the alternating segments 62 and 64 of the adjacent formed strips 56 in the troughs 82 to form a hexagonal block configuration 88. In the troughs 82 of a given formed strip 56 adjacent to the hexagonal block configuration 88, upper crotch reinforcing rod sections 90 and a lower crotch reinforcing rod 92 are disposed along and secured to upper and lower sloping elements 68 and 70, respectively, of adjacent segments of the alternating segments 62 and 64. In an exemplary embodiment, the lower block reinforcing rod sections 86 and/or the upper crotch reinforcing rod sections 90 are formed by positioning and securing a continuous reinforcing rod(s) in a corresponding trough(s) 82 and subsequently removing portions (e.g. via cutting, machining, grinding, milling, and the like) of the continuous reinforcing rod(s) to form the plurality of reinforcing rod sections 86 and/or 90 that are correspondingly spaced apart and longitudinally aligned.

As illustrated, a plurality of drainage gaps 93 are formed between adjacent sections of the reinforcing rod sections 83 for the lower block and upper crotch reinforcing rod sections 86 and 90. In an exemplary embodiment, the drainage gaps 93 are formed adjacent to central lower sections 94, e.g., central lower-most sections, of the upper and lower sloping elements 68 and 70. The inventors have found that by positioning the drainage gaps 93 along the lower sections, e.g., central lower sections 94, between the reinforcing rod sections 83, catalyst flows down the upper and lower sloping elements (indicated by single headed arrows 96). The catalyst advances through the drainage gaps 93 passing the corresponding reinforcing rod sections 83 to facilitate fluidized passage through the structured packing 54 to promote stripping of the gaseous hydrocarbons from the catalyst.

In an exemplary embodiment, the reinforcing rods sections 83 are spaced apart a distance 102 of from about 25 to about 75% of a width 104 of the upper and/or lower sloping elements 68 and 70 to define the drainage gaps 83. In one example, the width 104 of the upper and/or lower sloping elements 68 and 70 is from about 50 to about 150 mm and the distance 102 between the reinforcing rod sections 83 is from about 25 to about 100 mm.

Accordingly, apparatuses and processes for stripping gaseous hydrocarbons from particulate material have been described. Unlike the prior art, the exemplary embodiments taught herein provide a structured packing that is disposed in a stripping section of a vessel. The structured packing is configured for passage of particles that contain hydrocarbons and a stripping vapor in countercurrent contacting flow to remove at least a portion of the hydrocarbons with the stripping vapor to form stripped particles. The structured packing comprises a plurality of sloping elements that are configured to move the particles side to side as they advance through the structured packing to improve contact between the particles and the stripping vapor. The sloping elements are coupled to a plurality of reinforcing rod sections that are disposed adjacent to lower sections of the sloping elements. The reinforcing rod sections are spaced apart such that drainage gaps are formed between the reinforcing rod sections. In an exemplary embodiment, each of the sloping elements is associated with one of the drainage gaps that is formed adjacent to the lower section of the sloping element. As the particles descend through the structured packing, the particles contact and advance down the sloping elements towards the lower sections of the sloping elements. The drainage gaps allow the particles to advance over the lower sections past the reinforcing rod sections.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for stripping gaseous hydrocarbons from particulate material, the apparatus comprising:
    a structured packing configured for passage of a stripping vapor and particles that contain hydrocarbons in countercurrent contacting flow to remove at least a portion of the hydrocarbons with the stripping vapor to form stripped particles, the structured packing comprising:
        a first formed strip comprising a sloping element that has a lower section; and
        a pair of reinforcing rod sections disposed adjacent to the lower section of the sloping element and spaced apart such that a drainage gap is formed between the pair of reinforcing rod sections for passage of the particles.

2. The apparatus of claim 1, wherein the pair of reinforcing rod sections are longitudinally aligned.

3. The apparatus of claim 2, wherein the sloping element has a width of from about 50 to about 150 mm.

4. The apparatus of claim 2, wherein the pair of reinforcing rod sections are spaced apart a distance of from about 25 to about 100 mm to define the drainage gap.

5. The apparatus of claim 1, wherein the first formed strip comprises first alternating segments that define a first vertical element that has a first upper portion and a first lower portion, wherein the first alternating segments each have a first upper sloping element extending from the first upper portion at a first incline to the first vertical element, wherein the sloping element is one of the first upper sloping elements, and wherein the first upper sloping elements of adjacent segments of the first alternating segments are angular to each other, and wherein the apparatus further comprises:
    a first plurality of upper reinforcing rod sections that include the pair of reinforcing rod sections, wherein the first plurality of upper reinforcing rod sections overlie the first upper portion of the first vertical element and are disposed adjacent to the first upper sloping elements, and wherein the first plurality of upper reinforcing rod sections are spaced apart such that a first plurality of drainage gaps are formed each correspondingly adjacent to one of the first upper sloping elements.

6. The apparatus of claim 5, wherein the first upper sloping elements each have a first lower-most section that is coupled to the first upper portion of the first vertical element, and wherein the first plurality of upper reinforcing rod sections are coupled to the first lower-most sections of the first upper sloping elements.

7. The apparatus of claim 6, wherein the first upper sloping elements each have a first upper section extending to a first lower section that includes the first lower-most section, and wherein the first plurality of drainage gaps are formed adjacent to first lower sections.

8. The apparatus of claim 5, wherein the first upper sloping elements each have a first outer edge portion, a second outer edge portion, and a first central portion that extends between the first and second outer edge portions, and wherein the first plurality of drainage gaps are formed adjacent to the first central portions.

9. The apparatus of claim 5, wherein the first plurality of upper reinforcing rod sections are spaced apart a distance of from about 25 to about 75% of a width of the first upper sloping elements.

10. The apparatus of claim 5, wherein the first alternating segments each have a first lower sloping element extending from the first lower portion at a second incline to the first vertical element, wherein the first lower sloping elements of the adjacent segments of the first alternating segments are angular to each other, and wherein the apparatus further comprises:
    a second plurality of lower reinforcing rod sections disposed adjacent to the first lower sloping elements of alternate segments of the first alternating segments distally from the first vertical element, wherein the second plurality of lower reinforcing rod sections are spaced apart such that a second plurality of drainage gaps are formed each correspondingly adjacent to one of the first lower sloping elements of the alternate segments.

11. The apparatus of claim 10, wherein the second plurality of upper reinforcing rod sections are spaced apart a distance of from about 25 to about 75% of a width of the second upper sloping elements.

12. The apparatus of claim 10, wherein the first alternating segments each have the first upper sloping element and the first lower sloping element extending from the first vertical element in opposite directions.

13. The apparatus of claim 10, further comprising
    a second formed strip disposed adjacent to the first formed strip and comprising second alternating segments that define a second vertical element that has a second upper portion and a second lower portion, wherein the second alternating segments each have a second upper sloping element and a second lower sloping element extending from the second upper portion and the second lower portion, respectively, at a third incline to the second vertical element, and wherein the second upper sloping elements and independently the second lower sloping elements of the second alternating segments extend in alternating directions that are angular to each other; and
    a third upper reinforcing rod coupled to the first and second upper sloping elements of a first plurality of segments of the first and second alternating segments distally from the first and second vertical elements, respectively, wherein the second plurality of lower reinforcing rod sections are coupled to the first and second lower sloping elements of a second plurality of segments of the first and second alternating segments distally from the first and second vertical elements, respectively, and wherein the second plurality of lower reinforcing rod sections are spaced apart such that the second plurality of drainage gaps are formed each correspondingly adjacent to one of the first and second lower sloping elements of the second plurality of segments of the first and second alternating segments.

14. The apparatus of claim 13, further comprising:
    a tie bar disposed through the first and second vertical elements to secure the first and second formed strips in an array.

15. An apparatus for stripping gaseous hydrocarbons from particulate material, the apparatus comprising:
    a vessel containing a stripping section;
    an entrance for advancing particles that contain hydrocarbons to the stripping section;

a distributor for uniformly communicating a stripping vapor to the stripping section;

a structured packing disposed in the stripping section and configured for passage of the particles and the stripping vapor in countercurrent contacting flow to remove at least a portion of the hydrocarbons with the stripping vapor to form stripped particles, the structured packing comprising:

a first formed strip comprising first alternating segments that define a first vertical element that has a first upper portion and a first lower portion, wherein the first alternating segments each have a first upper sloping element and a first lower sloping element extending from the first upper portion and the first lower portion, respectively, in opposite directions and at an incline to the first vertical element, and wherein the first upper sloping elements and independently the first lower sloping elements of the first alternating segments extend in alternating directions that are angular to each other;

a plurality of reinforcing rod sections comprising:

a first plurality of upper reinforcing rod sections overlying the first upper portion of the first vertical element and disposed adjacent to the first upper sloping elements, wherein the first plurality of upper reinforcing rod sections are spaced apart such that a first plurality of drainage gaps are formed each correspondingly adjacent to one of the first upper sloping elements; and/or a second plurality of lower reinforcing rod sections disposed adjacent to the first lower sloping elements of alternate segments of the first alternating segments distally from the first vertical element, wherein the second plurality of lower reinforcing rod sections are spaced apart such that a second plurality of drainage gaps are formed each correspondingly adjacent to one of the first lower sloping elements of the alternate segments; and a port for receiving the stripped particles.

16. The apparatus of claim 15, wherein the first plurality of upper reinforcing rod sections are longitudinally aligned, and/or the second plurality of lower reinforcing rod sections are longitudinally aligned.

17. The apparatus of claim 15, wherein the first upper sloping elements have a first width of from about 50 to about 150 mm, and/or the second upper sloping elements have a second width of from about 50 to about 150 mm.

18. The apparatus of claim 15, wherein the first plurality of upper reinforcing rod sections are spaced apart a first distance of from about 25 to about 100 mm to define the first plurality of drainage gaps, and/or wherein the second plurality of upper reinforcing rod sections are spaced apart a second distance of from about 25 to about 100 mm to define the second plurality of drainage gaps.

19. The apparatus of claim 15, wherein the first plurality of upper reinforcing rod sections are spaced apart a first distance of from about 25 to about 75% of a first width of the first upper sloping elements, and/or the second plurality of upper reinforcing rod sections are spaced apart a second distance of from about 25 to about 75% of a second width of the second upper sloping elements.

20. A process for stripping gaseous hydrocarbons from particulate material, the process comprising the step of:

contacting particles containing hydrocarbons with a stripping vapor in countercurrent flow to remove at least a portion of the hydrocarbons with the stripping vapor to form stripped particles, wherein contacting the particles includes:

advancing the particles down a sloping element of a structured packing toward a lower section of the sloping element;

passing the particles through a drainage gap formed between a pair of reinforcing rod sections that are disposed adjacent to the lower section of the sloping element; and contacting the particles with the stripping vapor that is rising up adjacent to the drainage gap.

* * * * *